(12) United States Patent
Mazaheri et al.

(10) Patent No.: US 12,546,414 B2
(45) Date of Patent: Feb. 10, 2026

(54) STABILIZATION MECHANISM FOR POWER CABLES AND CONTROL UMBILICALS

(71) Applicant: Chevron U.S.A. Inc., San Ramon, CA (US)

(72) Inventors: Alireza Mazaheri, Cottesloe (AU); Farzan Parsinejad, Houston, TX (US); Kenneth Andrew Peoples, City Beach (AU); Leo G. Caffrey, Fulshear, TX (US); Antonio C.F. Critsinelis, Houston, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 85 days.

(21) Appl. No.: 18/682,554

(22) PCT Filed: Aug. 11, 2022

(86) PCT No.: PCT/US2022/074876
§ 371 (c)(1),
(2) Date: Feb. 9, 2024

(87) PCT Pub. No.: WO2023/019228
PCT Pub. Date: Feb. 16, 2023

(65) Prior Publication Data
US 2024/0344635 A1    Oct. 17, 2024

Related U.S. Application Data

(60) Provisional application No. 63/232,092, filed on Aug. 11, 2021.

(51) Int. Cl.
*H02G 9/02*    (2006.01)
*F16L 1/12*    (2006.01)
(Continued)

(52) U.S. Cl.
CPC ............... *F16L 1/123* (2013.01); *H02G 1/10* (2013.01); *H02G 9/025* (2013.01); *H02G 9/06* (2013.01)

(58) Field of Classification Search
CPC    F16L 1/123; H01B 7/14; H01B 17/18; H02G 1/10; H02G 9/025
See application file for complete search history.

(56) References Cited

U.S. PATENT DOCUMENTS 2,299,356 A * 10/1942 Strohm ................... A62C 33/06
                                                                104/275
4,028,894 A *  6/1977 Larsen ....................... E02B 3/12
                                                                 405/74
(Continued)

FOREIGN PATENT DOCUMENTS

DE    102019122500 A1    2/2021
EP       1895220 A1       3/2008
(Continued)

OTHER PUBLICATIONS

PCT International Search Report mailed on Nov. 25, 2022, issued in International Application No. PCT/US2022/074876, filed on Aug. 11, 22, 13 pages.

*Primary Examiner* — Benjamin F Fiorello
(74) *Attorney, Agent, or Firm* — Avery L. Cate

(57) ABSTRACT

An artificial cable trench (ACT) includes a body and a trench formed into the body. The trench is configured to hold a cable, umbilical, or similar feature. The ACT may be positioned along a seabed or shoreline to stabilize the cable and thereby prevent movement and eventual damage to the cable. The body of the ACT is shaped to overcome the flow induced loads caused by the relative motion between the cable and the surrounding waves and sea currents as well as providing effective friction/engagement with a contact surface (e.g., a shoreline surface). The ACT may have features (Continued)

that result in self-burying in sand and/or preventing lateral movement.

26 Claims, 6 Drawing Sheets

(51) Int. Cl.
*H02G 1/10* (2006.01)
*H02G 9/06* (2006.01)

(56) References Cited

U.S. PATENT DOCUMENTS

| | | | | |
|---|---|---|---|---|
| 4,171,174 | A * | 10/1979 | Larsen | E02B 3/04 405/74 |
| 5,193,937 | A * | 3/1993 | Miller | E02B 3/127 405/172 |
| 2010/0086363 | A1 * | 4/2010 | Manimala | F16L 1/123 405/211 |
| 2010/0282352 | A1 * | 11/2010 | Maue | H02G 9/025 138/104 |
| 2011/0305518 | A1 * | 12/2011 | Pearce | F03B 17/061 174/136 |
| 2016/0301198 | A1 * | 10/2016 | Manabe | H02G 1/10 |
| 2019/0011062 | A1 * | 1/2019 | Olsen | E21B 41/0007 |
| 2019/0229506 | A1 * | 7/2019 | Henry | H02G 3/0418 |
| 2020/0212622 | A1 * | 7/2020 | Shahriar | H01R 13/5213 |
| 2020/0370541 | A1 * | 11/2020 | Moeller | H02G 1/10 |

FOREIGN PATENT DOCUMENTS

| | | |
|---|---|---|
| EP | 4297210 A1 | 12/2023 |
| GB | 2345198 B | 5/2002 |
| JP | H10201044 A | 7/1998 |
| WO | 2010081504 A1 | 7/2010 |

* cited by examiner

POTENTIAL DISPLACEMENT WITHOUT ACT

REDUCED DISPLACEMENT WITH ACT

STABILIZATION MECHANISM FOR POWER CABLES AND CONTROL UMBILICALS

FIELD

The present disclosure relates to systems and methods for cable stabilization. More specifically, the present disclosure relates to systems and methods for stabilizing power cables and control umbilicals at subsea and at shorelines.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

One of the main challenges in development of subsea infrastructures is maintaining a reliable power supply as well as control system to ensure continuous operation. Such developments often rely on power cables and control umbilicals extending from the subsea infrastructure to the source of the power supply and the control center located either at an offshore platform tieback or onshore by crossing shorelines. While in recent years the energy industry has made significant effort to develop techniques to achieve reliable stabilization for pipelines on the seabed to overcome the effects of vortex induced vibration (VIV) and seabed changes leading to unsupported spans, little to no progress has been made towards stabilization of power cables and control umbilicals located subsea and at shorelines.

Destabilization of the power cable and/or control umbilical at shorelines occurs exponentially faster than in submerged environments due to strong current velocity. Strong current velocities, particularly at shorecrossing zones, can generate high magnitude hydrodynamic forces leading to dislocation of the power cable and/or control umbilical to unplanned routes and often results in functional failure.

Such failures not only introduce the significant challenge of rectifying the failure but also substantial loss of operating time-thereby disrupting critical energy supplies. Existing pipeline stabilization techniques do not fully address the needs for stabilizing power cables and control umbilicals subsea and at shorelines. Umbilicals and power cables are generally smaller and lighter than pipelines, and thus more prone to movement and subsequent damage. It is particularly challenging to achieve stabilization of umbilicals and power cables in locations subjected to severe environmental conditions (e.g., storms, high winds, high sea bottom currents) and/or locations having hard rock seabed. For instance, current velocities generally increase nearshore and in shallow waters-making shorecrossing zones particularly challenging for umbilical and cable stability. As another example, certain approaches such as Horizontal Directional Drilling (HDD) are extremely costly, technically challenging and have limitations with respect to accessibility as well as space for potential future development. As another example, some conventional stabilization methods that are utilized for on-bottom stabilization of pipelines or umbilicals on the seabed have been applied to shorecrossing stabilization. As a further example, rock bolting is a cost-effective method used for stabilizing small diameter pipelines; but it is not normally feasible for flexible umbilicals and power cables, which are more susceptible to movement between the intermittent rock bolting locations. These methods have their own challenges such as exposure of the cable and/or umbilicals to beach sand, which subject the cable and/or umbilicals to rapid erosion thereby compromising the initial stabilization. Therefore, conventional stabilization methods may be subject to improvement.

SUMMARY

A summary of certain embodiments disclosed herein is set forth below. These aspects are presented merely to provide the reader with a brief summary of these certain embodiments and that these aspects are not intended to limit the scope of this disclosure. Indeed, this disclosure may encompass a variety of aspects that may not be set forth below.

In accordance with various aspects of this disclosure, an artificial cable trench (ACT) is utilized as a stabilization mechanism for control umbilicals and/or power cables. The configuration of the ACT, particularly its geometrical configuration (e.g., shape), may be particularly relevant for providing a desired level of stabilization of such control umbilicals and/or power cables in areas of high water current velocities such as shorecrossing zones. The ACT includes a body and a trench formed into the body. The trench is configured to hold a control umbilical and/or power cable, or similar feature. The ACT may be positioned along a seabed or shoreline to stabilize the control umbilical and/or power cable and thereby prevent movement and eventual damage to the control umbilical and/or power cable. The body of the ACT is shaped to overcome the flow induced loads caused by the relative motion between the cable and the surrounding waves and sea currents. The ACT may also provide effective friction/engagement with a contact surface (e.g., a shoreline surface). The ACT may have features that result in self-burying in sand and/or attachment to uneven (e.g., rocky) surface features.

In one example aspect of this disclosure, an energy infrastructure system includes a first energy infrastructure installation connected to a second energy infrastructure installation via a cable that traverses a shorecrossing zone. An artificial cable trench (ACT) surrounds only a portion of the cable and lies at least partially underwater on a seabed or shoreline within the shorecrossing zone. The ACT is configured to stabilize the cable by reducing motion of the cable within the shorecrossing zone.

In another example aspect of this disclosure, an artificial cable trench (ACT) is configured to be used in conjunction with a cable associated with an oil and/or gas installation. The ACT includes a body having a trench formed as an internal cavity, and the trench is configured to receive the cable such that the body of the ACT and the cable have longitudinally aligned axes. The shape of ACT is configured to reduce or prevent displacement of the cable through resistance to flow induced loads.

In a further example aspect of this disclosure, a method of stabilizing a cable along a seabed or shoreline includes: positioning the cable within an artificial cable trench (ACT), the ACT having a body with a trench formed as an internal cavity in the body. The trench is configured to receive the cable such that the body of the ACT and the cable have longitudinally aligned axes. The method further includes positioning the ACT and the cable along the seabed or shoreline, and the shape of the ACT reduces or prevents displacement of the cable through resistance to flow induced loads.

BRIEF DESCRIPTION OF THE DRAWINGS

These and other objects, features and advantages of the present disclosure will become better understood with reference to the following description, appended claims and accompanying drawings, wherein:

DETAILED DESCRIPTION

As set forth above, conventional stabilization methods are often not effective or practical for stabilizing power cables and control umbilicals subsea and at shorelines, due to their relatively low weight to diameter ratio, which makes them more susceptible to movement when compared with other installations such as oil and gas pipelines. It is now recognized that there is a need to establish a system that not only provides a robust stabilization mechanism for power cables and control umbilicals on the projected routes at shorecrossing zones (e.g., shorelines and shallow waters) that are exposed to constant high velocity currents but also provides flexibility of installation.

Present embodiments meet this and other needs using an artificial cable trench (ACT) which lies along selected locations of a seabed or shoreline on the planned route of the power cables and/or control umbilicals extending from a subsea infrastructure to onshore or offshore power supply and control facilities. As an example, the power cables and/or control umbilicals may extend between an offshore facility (e.g., an offshore platform) having subsea infrastructure and a power supply/control center located onshore. The ACT may provide several advantages such as increasing longevity of power cables and control umbilicals, thereby reducing frequency of intervention, repair, and potential loss or halting of energy production. To facilitate discussion, the term "cable" is used in the following description as a generic term encompassing a power cable, a control umbilical, or a communication cable. Indeed, the presently disclosed ACTs may be used for stabilization of a variety of elongated lines, such as communication lines (e.g., fiber optic cables, telephone lines) or pipelines (e.g., oil and/or gas pipelines).

Figure 1:
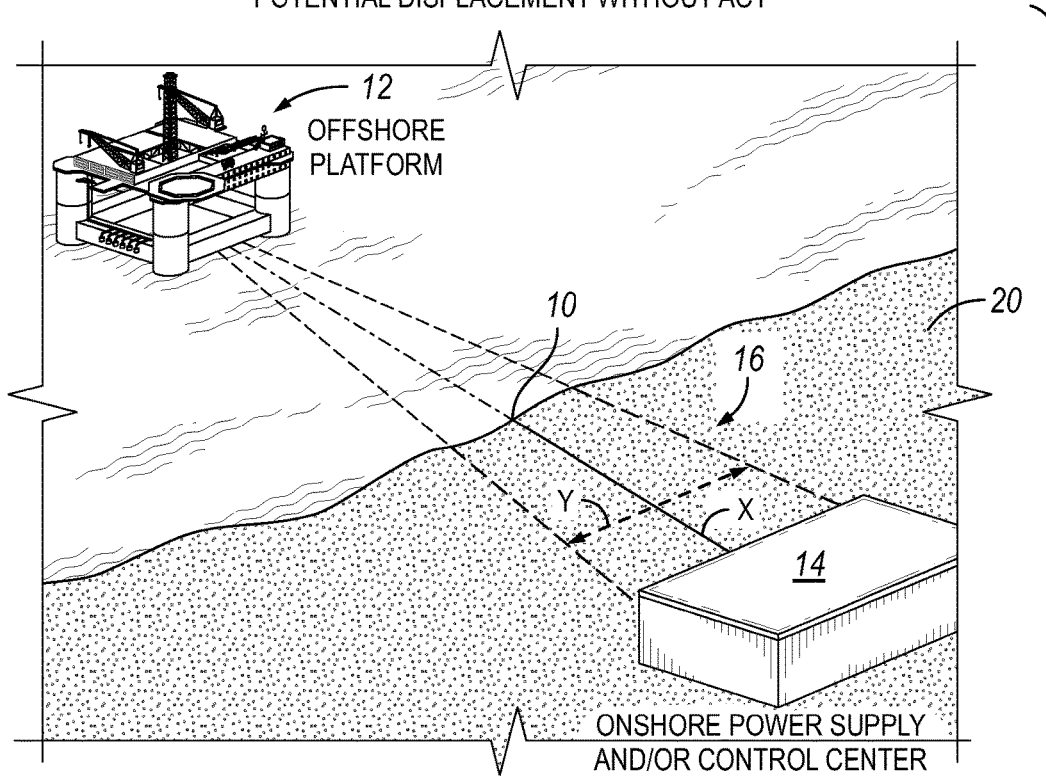
FIG. 1 is an example deployment of an artificial cable trench (ACT) along a shoreline, in accordance with an embodiment of this disclosure.
Figure 1:
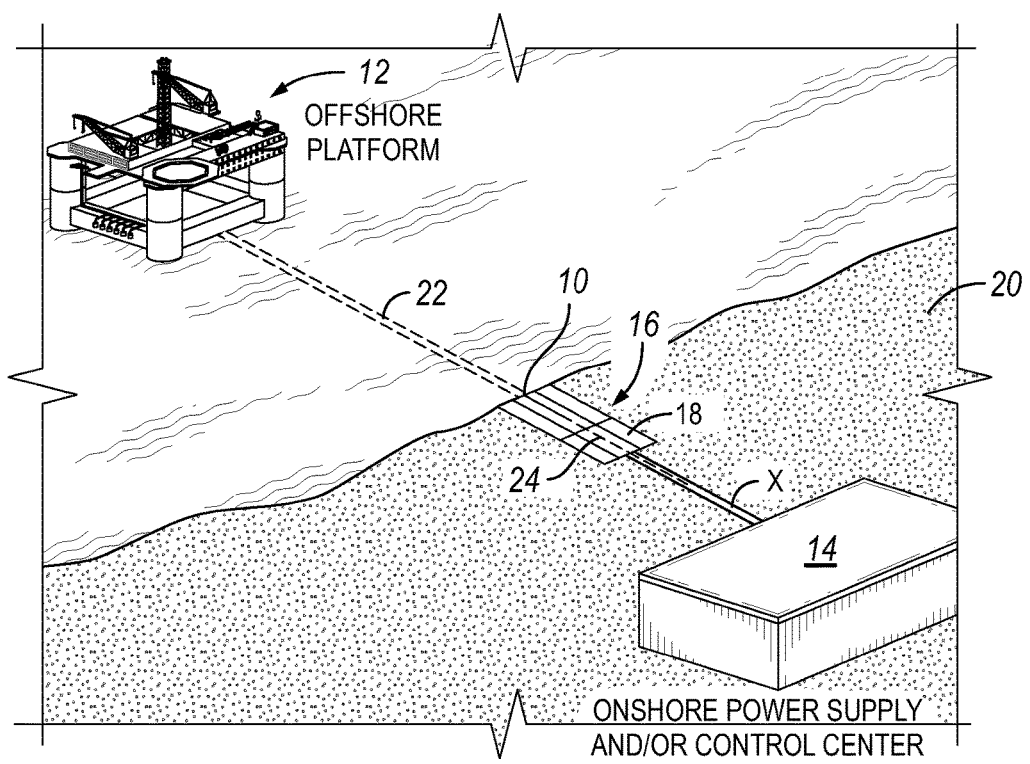

Generally, the ACT provides stability of the cable (or cables) subsea and/or upon crossing the shorelines against high velocity currents which may result in excessive forces (e.g., hydrodynamic forces) on the cable resulting in potential malfunction and/or failure. The ACTs described herein may be used within an energy infrastructure system, such as an oil and/or gas system that includes energy infrastructure installations that are connected via umbilicals, cables, etc that traverse shorecrossing zones. For instance, the ACTs described herein may be used as a stabilization mechanism for a cable that connects first and second energy infrastructure installations. Examples of energy infrastructure installations may include an offshore oil and/or gas platform, a subsea facility, an offshore windfarm, an offshore wave generator, an undersea power interconnector, a power supply, a control center, or any combination thereof. FIG. 1 is an example of an energy infrastructure system that is used to facilitate description of the presently disclosed ACTs.

As shown in FIG. 1, a cable 10 (e.g., an umbilical or power cable) connects an offshore oil and/or gas platform 12 (e.g., a first energy infrastructure installation) to a power supply and/or control center 14 (e.g., a second energy infrastructure installation). The cable 10 traverses a shorecrossing zone 16 where high velocity currents may be present. The high velocity currents may impart hydrodynamic forces to the cable 10 that cause the cable 10 to at least laterally displace, as shown in FIG. 1A.

An ACT 18 configured in accordance with present embodiments may be deployed within the shorecrossing zone 16, such as along a shoreline 20, to resist this displacement of the cable 10. In certain embodiments, the ACT 18 may also be deployed along a subsea cable route 22 to resist displacement (e.g., lateral displacement) that may otherwise occur due to waves or bottom currents. Specifically, the ACT 18 is positioned such that its longitudinal axis 24 is oriented in an intersecting manner, such as crosswise (e.g., perpendicular) to the shoreline 20.

Figure 2A:
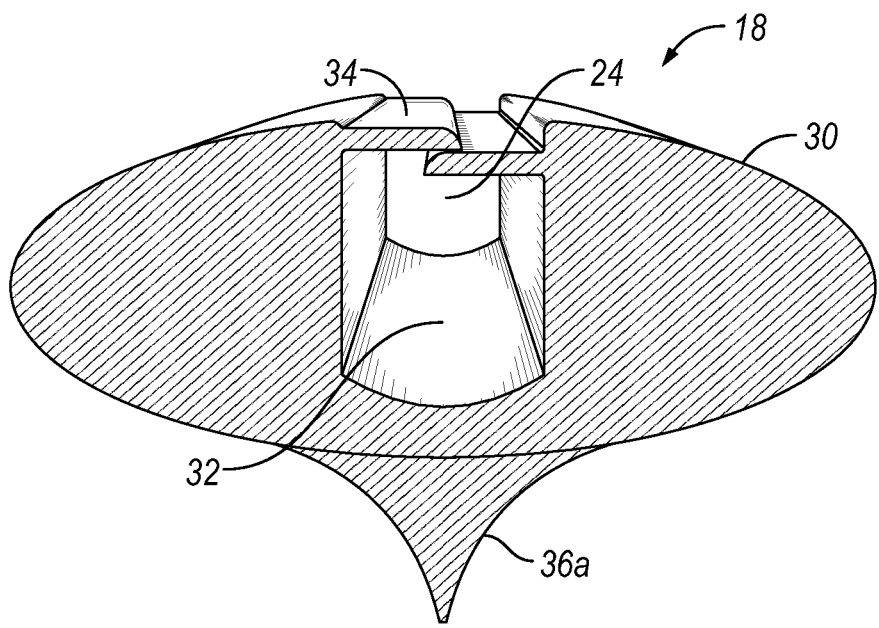
FIGS. 2A and 2B are front elevation views of an ACT having an obround shape, in accordance with an embodiment of this disclosure.
Figure 2B:
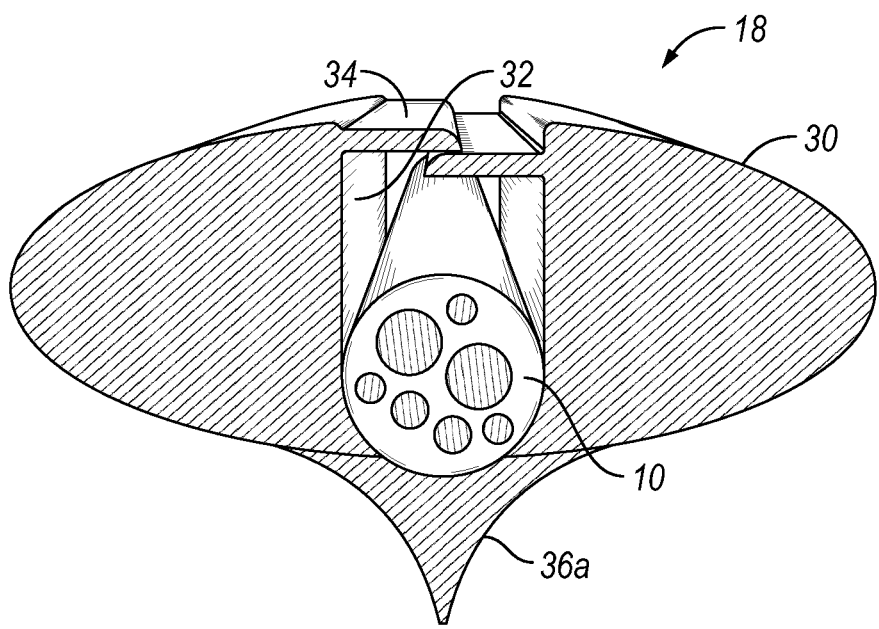
Figure 3A:
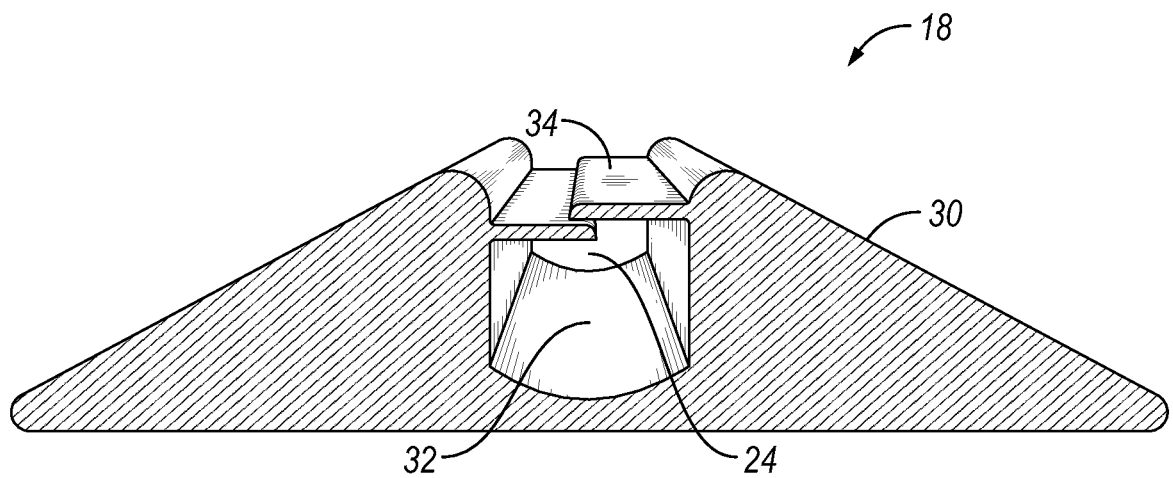
FIGS. 3A and 3B are front elevation views of an having a trapezoidal shape, in accordance with an embodiment of this disclosure.
Figure 3B:
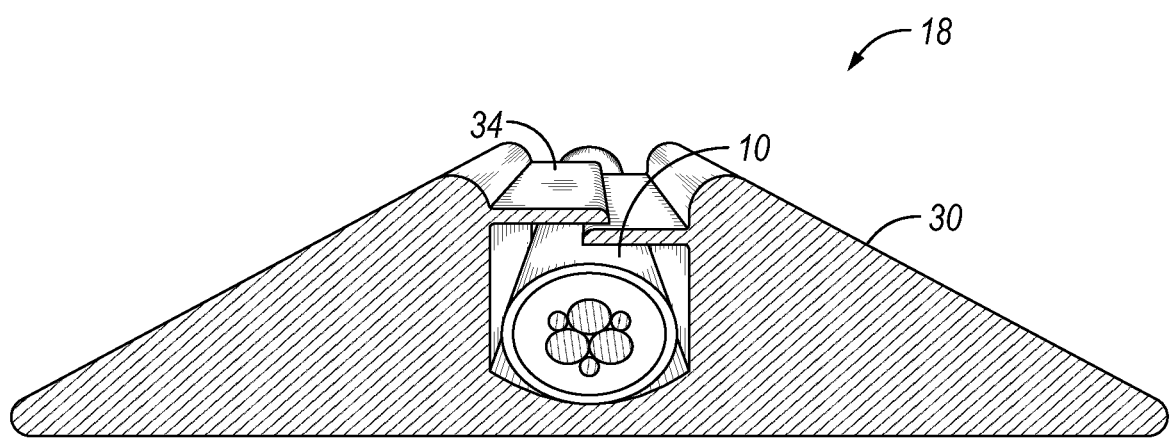

The particular configuration of the ACT 18 may depend on, among other things, the nature of the seabed or shoreline 20. As an example, if the seabed or shoreline 20 is primarily sand, the ACT 18 may have features that dig into the sand to provide additional stability. Such a configuration, an embodiment of which is depicted in FIGS. 2A and 2B, is referred to herein as a sandy-type or "Type S" configuration. As another example, if the seabed or shoreline 20 is rocky, the ACT 18 may have features that grip the rocky surface of the seabed or shoreline 20 to provide additional stability. Such a configuration, an embodiment of which is depicted in FIGS. 3A and 3B, is referred to herein as a rocky-type or "Type R" configuration. It should be noted that these configurations are not necessarily mutually exclusive. That is, elements of both Type S and Type R configurations may be used together in a single ACT 18. Indeed, these configurations are designed to satisfy stabilization requirements for their respective seabed or shoreline conditions. The internal configuration of both ACT Types S & R is designed so that cables can be positioned securely upon installation.

As described below, the shape of the ACT 18 is designed to overcome the flow induced loads caused by the relative motion between the cable and the surrounding waves as well as providing effective friction/engagement with the contact surface of the seabed or shoreline 20. Indeed, the respective shapes of the ACTs described herein have been found through computational fluid dynamics (CFD) analysis to have superior resistance to lateral, axial, and vertical displacement (lift) relative to other shapes. In this respect, the shape of the ACT is a critical feature for obtaining the technical effect of reducing or preventing displacement through resistance to flow induced loads. The shapes of the Type S and Type R ACTs not only have a higher dynamic tolerance but also facilitate changing the wave formation from orbital to ellipsoidal providing a reduction of drag force and thus further stability. The hydrodynamic shape of the ACT 18 causes the separation point between the flow and the cable 10 to move further back thereby reducing the drag force on the cable 10. In addition to the shape, the weight of the ACT 18 and the weight of the cable 10 may be selected to provide sufficient gravity to resist potential vertical movement due to the impact of current or wave motion and acceleration.

The configuration of the ACTs 18 described herein may result in preventing lateral movement (Types S and R as shown in FIGS. 2 and 3), and/or self-burying in sand (Type S as shown in FIGS. 2A and 2B). Referring now to FIGS. 2-5 generally, the illustrated ACTs 18 include a body 30 which is hydrodynamically shaped to reduce forces imparted to the cable 10. More specifically, the overall shape of the ACT 18 is configured to change wave formation from orbital to ellipsoidal providing a reduction of drag force on the cable 10. In these embodiments, the body 30 defines most or all of the shape of the ACT 18. The ACT 18 of FIGS. 2A and 2B includes an obround (e.g., ellipsoidal) cross sectional geometry. The ACT 18 of FIGS. 3A and 3B includes a trapezoidal cross sectional geometry.

With regard to the construction of the ACT 18, the body 30 of the ACT 18 may be made from a material that is moldable. Indeed, in certain embodiments, the ACT 18 may be an integral part of an outer section of the cable 10. The degree of moldability, flexibility, etc. of the material is subject to design considerations for each particular application. For example, surface interactions with soil/sand/rock may be important considerations in determining the material for the ACT 18. In certain embodiments, the material of the ACT 18 may be chosen to either encourage or discourage marine growth. For example, using a material that encourages marine growth may allow the ACT 18 to become more stable over time as additional material accumulates on the ACT 18.

A trench 32 is formed into the body 30 of the ACT 18 as an internal cavity configured to receive the cable 10, as shown in FIGS. 2B and 3B. In certain embodiments, the shape of the trench 32 and the body 30 of the ACT 18 resists the effects of hydrodynamic forces resulting in reduction of the cable motion/acceleration. The trench 32 allows the body 18 to at least partially surround the cable 10 when the cable 10 is in the ACT 18. The configuration of the trench 32 generally causes the body 30 of the ACT 18 and the cable 10 to have parallel longitudinal axes (e.g., aligned longitudinal axes).

The ACTs may also include one or more flexible protection covers 34 situated about (e.g., above) the trench 32 in the body 30 of the ACT 18. In the illustrated embodiments of FIGS. 2-3, for example, the flexible protection covers 34 are configured as two overlapping and resilient flaps. The flexible protection covers 34 are generally configured to protect the cable 10 or cables 10 situated in the trench 32 from damage from dropped or falling objects (e.g., crushing forces). The flexible protection covers 34 may also allow the cable 10 to be snapped into the trenches 32 so that during installation, the cable 10 can either be threaded into the trench 32 or it can be snapped into place. The flexible protection covers 34 may also be configured to have anisotropic flexion. That is, the flexible protection covers 34 may be configured to flex more readily in one direction (e.g., downward, toward the trench) than another direction (e.g., upward, away from the trench). This may allow the cable 10 to be readily snapped into the trench 32 but require a higher amount of force for removal of the cable 10 from the trench 32 for stability purposes.

Figure 4:
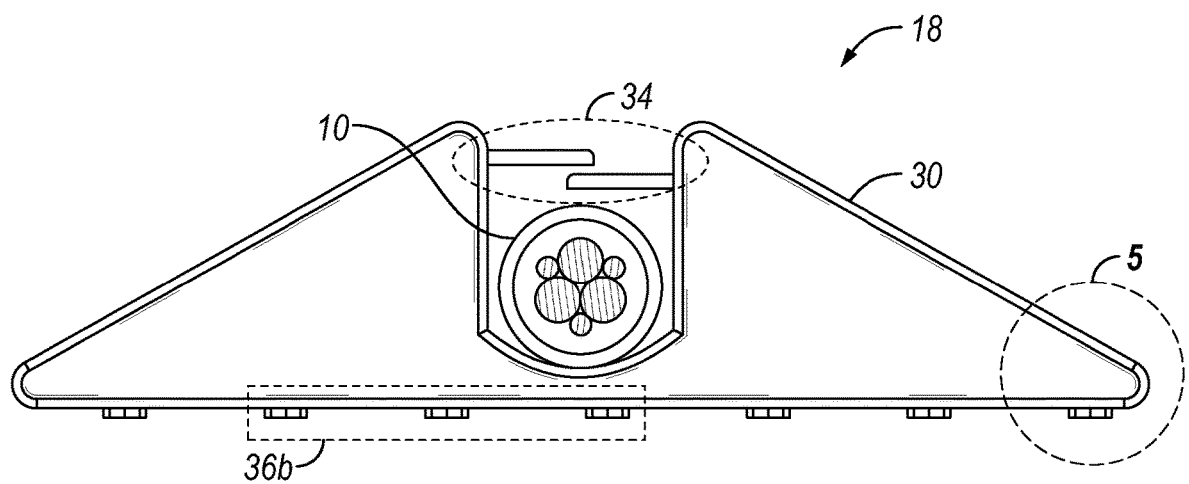
FIG. 4 is a front elevation view of the ACT of FIG. 3B, the ACT having surface engagement features, in accordance with an embodiment of this disclosure.

As described in more detail with respect to FIGS. 2A and 2B and FIG. 4, the ACTs 18 configured in accordance with this disclosure may, in some embodiments, include a surface engagement feature 36 (e.g., a bottom surface engagement feature) to engage the seabed or shoreline 20. In other embodiments, no surface engagement feature 36 may be present. The ACT 18 of FIGS. 2A and 2B may, as illustrated, incorporate a fin 36a as the surface engagement feature 36. The fin 36a is configured to dig into relatively soft resting surfaces such as sand. For instance, after deployment, as hydrodynamic forces act over time on the ACT 18, the fin 36a may self-dig into the sand or other surface to provide additional stability.

The ACT 18 may be a monolithic device (i.e., formed as a single, solid piece) or may include several pieces that are fit together either before or during installation. As one non-limiting example, the ACT 18 may have one or more pieces forming the body 30 of the ACT 18, and another, separate, one or more pieces forming the surface engagement feature 36 of the ACT 18 (e.g., the fin 36a). In certain configurations, the fin 36a may be removable to allow for servicing and/or replacement. In still further configurations, the Type S ACT 18 may have multiple fins 36a or a combination of one or more fins 36a and one or more additional surface engagement features 36 such as grips, spikes, etc.

For the Type R ACT 18 depicted in FIGS. 3a and 3b, as noted the body 30 of the ACT 18 may have a geometry that allows for enhanced contact surface area with even surfaces as well as asymmetrical or rough, rocky surfaces. As depicted, the shape of the body 30 of the ACT 18 is a trenched trapezoidal prism. As shown in FIG. 4 and depicted in further detail in FIG. 5, the bottom of the Type R ACT 18 has one or more gripping features 36b that serve as the surface engagement features 36. The particular configuration of the gripping features 36b depicted in FIG. 5 is one example, with other shapes being possible depending on a particular deployment scenario.

Figure 5:
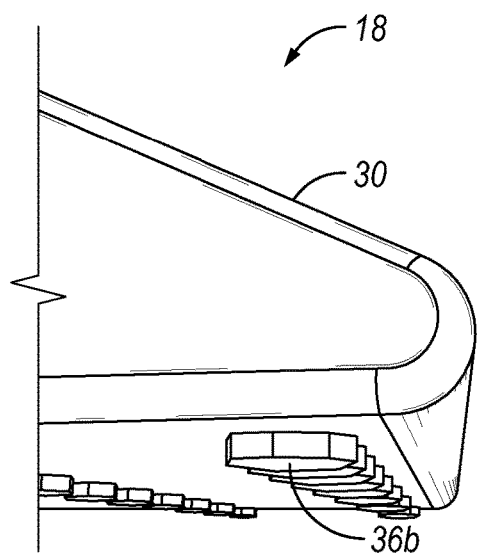
FIG. 5 is an expanded view of example gripping features of the ACT of FIG. 4.

In the illustrated embodiment of FIGS. 4 and 5, the one or more gripping features 36b are protrusions extending from the bottom of the ACT 18 (i.e., the portion of the ACT 18 that would rest against the seabed or shoreline 20) and having a shape that facilitates surface area interaction between the ACT 18 and rocky surfaces. More specifically, the gripping features 36b increase friction between the ACT 18 and rocky surfaces. The gripping features 36b may be made of the same material as the ACT body 30, or a different material. In this regard, the gripping features 36b may be integral with the ACT body 30 or removable/modular to allow for the use of different grip types or shapes. In some embodiments, the gripping features 36b may be made of a material that demonstrates enhanced friction as its surface becomes wet with seawater. An example of such a material is an absorptive material that softens when wet. The Type R ACT 18 may additionally or alternatively include bolt holes to allow for bolts to be used to secure the ACT 18 to rock seabeds.

Figure 6:
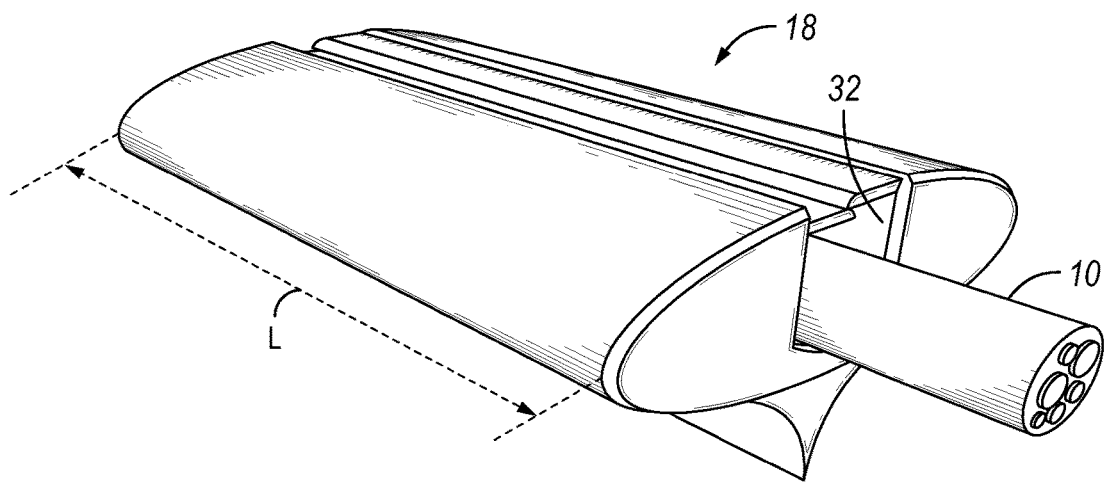
FIG. 6 is an overhead perspective view of the ACT of FIG. 2A, having an installed cable.
Figure 7:
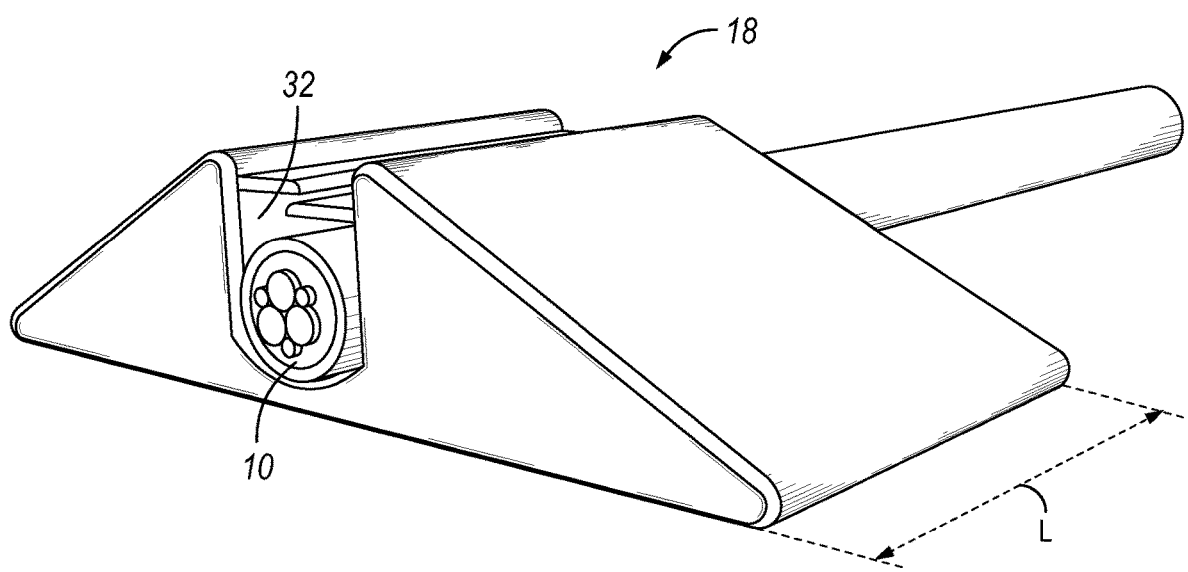
FIG. 7 is an overhead perspective view of the ACT of FIG. 3A, having an installed cable.

As noted, the design of the ACT 18 provides installation and deployment flexibility as various dimensions can be adjusted/fabricated to fit specified sizes of cables 10 or other features and can be installed at any point in the lifetime of the cable 10. As shown in FIGS. 6 and 7, the length of the ACT 18 (denoted as "L" in both FIGS) may be customized to cover the length needed to provide the required cable stabilization for a particular application. Indeed, the ACT 18 is configured such that the aspect ratio of the ACT 18 results in elongated geometries as depicted. The trench 32 of the ACT 18 may additionally or alternatively be customized in size (e.g., its width may be adjusted/fabricated) so that the cable 10 has a predetermined fitment within the trench 32. The materials present within the trench 32 may also be selected to have particular properties.

Figure 8:
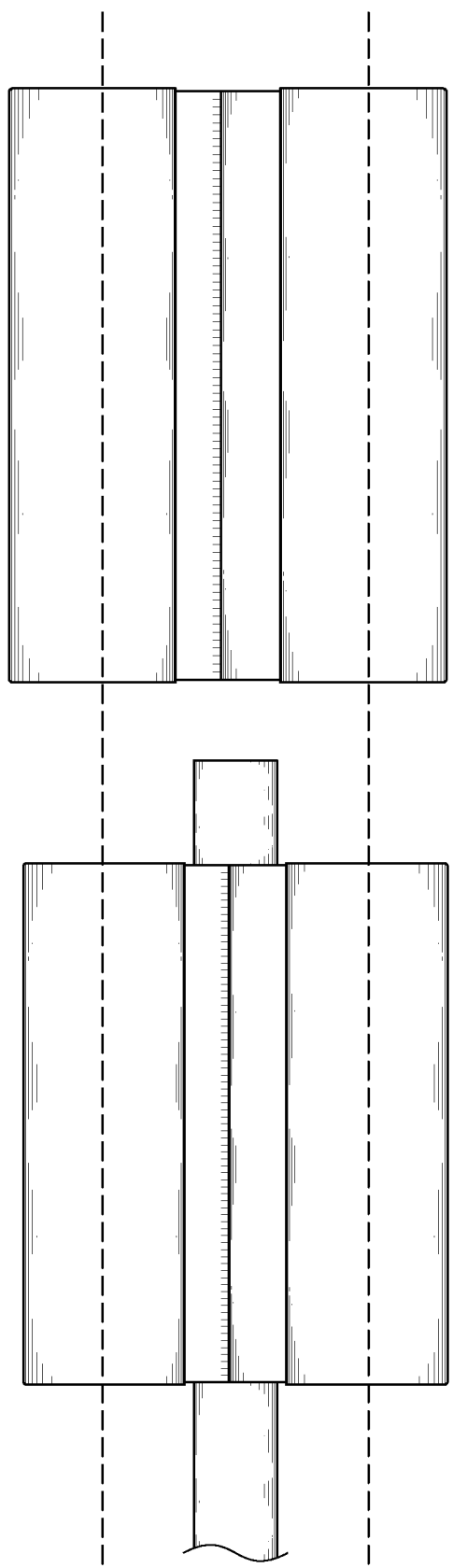
FIG. 8 is a diagram of an example process of deploying an ACT, in accordance with an embodiment of this disclosure.

The ACT 18 can be fabricated and transported to a desired location and the subject cable 10 can be placed within it to support installation completion, for example as shown in FIG. 8. In particular, as shown in FIG. 8, a first step may include deploying (positioning) the ACT 18 along a cable route, and a second step may include positioning the cable 10 within the ACT 18.

In another embodiment, a deployment process includes attaching the ACT 18 onto the cable 10 from a cable lay vessel and simultaneously deploying the ACT 18 with the cable lay. This process eliminates the need for secondary vessel operations.

In certain situations, design considerations may call for cables to be routed along certain paths that are similar or cross one another. In this regard, the ACTs described herein may have multiple trenches running parallel or crosswise to one another. For crossing protection, for instance, an ACT may include one trench for a first cable and another, separate trench for a second cable. The trenches may be longitudinally oriented along the same or different directions.

The ACTs described herein are not necessarily limited to the uses described herein, or to being used in lieu of other stabilization features. Indeed, the ACTs may be used for new installations, for retrofitting operations, for maintenance operations, and so forth. Further, the ACTs may be used in combination with other stabilization features, such as those described in U.S. Pat. No. 8,708,602, which is incorporated by reference herein for all purposes.

For the purposes of this specification and appended claims, unless otherwise indicated, all numbers expressing quantities, percentages or proportions, and other numerical values used in the specification and claims are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one referent.

Unless otherwise specified, the recitation of a genus of elements, materials or other components, from which an individual component or mixture of components can be selected, is intended to include all possible sub-generic combinations of the listed components and mixtures thereof. Also, "comprise," "include" and its variants, are intended to be non-limiting, such that recitation of items in a list is not to the exclusion of other like items that may also be useful in the materials, compositions, methods and systems of this invention.

What is claimed is:

1. An energy infrastructure system comprising:
    a first energy infrastructure installation connected to a second energy infrastructure installation via a cable that traverses a shorecrossing zone; and
    an artificial cable trench (ACT) surrounding only a portion of the cable and lying at least partially underwater on a seabed or shoreline within the shorecrossing zone, and wherein the ACT is configured to stabilize the cable by reducing motion of the cable within the shorecrossing zone, wherein:
        the ACT comprises a trench formed as an internal cavity into a body of the ACT and configured to at least partially surround the portion of the cable,
        the ACT comprises one or more flexible protection covers situated about the trench in the body of the ACT, and
        the one or more flexible protection covers are configured as resilient flaps that overlap each other over at least a portion of the trench.

2. The system of claim 1, wherein the overall shape of the ACT is configured to change wave formation from orbital to ellipsoidal providing a reduction of drag force on the cable within the shorecrossing zone.

3. The system of claim 2, wherein at least a portion of the ACT comprises an obround cross-sectional geometry.

4. The system of claim 3, wherein the obround cross-sectional geometry is ellipsoidal.

5. The system of claim 2, wherein the ACT comprises a longitudinal axis generally aligned with the longitudinal axis of the cable, and a length of the ACT along the longitudinal axis is selected to provide a predetermined amount of stabilization of the cable within the shorecrossing zone.

6. The system of claim 1, where in the ACT comprises an additional trench configured to receive an additional cable to provide crossing protection between the cable and the additional cable.

7. The system of claim 1, wherein the ACT comprises a moldable polymeric material.

8. The system of claim 1, wherein the ACT comprises a material chosen to encourage marine growth thereby allowing the ACT to become more stable over time as additional material accumulates on the ACT.

9. The system of claim 1, wherein the ACT is configured to reduce lateral displacement, axial displacement, vertical displacement, or any combination thereof, of the cable within the shorecrossing zone.

10. The system of claim 1, wherein the ACT comprises a body formed as a monolithic structure.

11. The system of claim 1, wherein the ACT comprises a surface engagement feature configured to engage the seabed or shoreline.

12. The system of claim 11, wherein the surface engagement feature comprises a fin configured to self-bury into sand as the ACT experiences hydrodynamic forces within the shorecrossing zone.

13. The system of claim 11, wherein the surface engagement feature comprises one or more gripping features having protrusions extending from the bottom of the ACT and having a shape that facilitates surface area interaction between the ACT and rocky surfaces.

14. The system of claim 1, wherein the first energy infrastructure installation and the second energy infrastructure installation individually comprise an offshore oil and/or gas platform, a subsea facility, an offshore windfarm, an offshore wave generator, an undersea power interconnector, a power supply, a control center, or any combination thereof.

15. The system of claim 1, wherein the cable comprises an umbilical, a power cable, or a communications cable.

16. The system of claim 1, wherein each resilient flap has anisotropic flexion such that the resilient flap is configured to more readily flex in a first direction than in a second direction.

17. The system of claim 1, wherein the resilient flaps are connected to the body of the ACT within the trench at a location vertically below an uppermost edge of the body of the ACT.

18. An artificial cable trench (ACT) configured to be used in conjunction with a cable associated with an oil and/or gas installation, the ACT comprising:
- a body having a trench formed as an internal cavity into the body, the trench being configured to receive the cable such that the body of the ACT and the cable have longitudinally aligned axes, wherein:
- the ACT comprises one or more flexible protection covers situated about the trench in the body of the ACT,
- the one or more flexible protection covers are configured as one or more resilient flaps, each resilient flap having anisotropic flexion such that the resilient flap is configured to more readily flex in a first direction than in a second direction, and
- the shape of ACT is configured to reduce or prevent displacement of the cable through resistance to flow induced loads.

19. The ACT of claim 18, wherein the shape comprises an obround cross-sectional geometry.

20. The ACT of claim 19, wherein the obround cross-sectional geometry is taken transverse relative to the longitudinal axis of the ACT.

21. The ACT of claim 18, wherein the one or more flexible protection covers are configured as resilient flaps that overlap each other over at least a portion of the trench.

22. A method of stabilizing a cable along a seabed or shoreline, the method comprising:
- positioning the cable within an artificial cable trench (ACT), the ACT comprising a body having a trench formed as an internal cavity, the trench being configured to receive the cable such that the body of the ACT and the cable have parallel longitudinal axes; and
- positioning the ACT and the cable along the seabed or shoreline, and wherein the shape of the ACT is configured to reduce or prevent displacement of the cable through resistance to flow induced loads, wherein:
- the ACT comprises one or more flexible protection covers situated about the trench in the body of the ACT,
- the flexible protection covers are configured as resilient flaps, and
- the resilient flaps are connected to the body of the ACT within the trench at a location vertically below an uppermost edge of the body of the ACT.

23. The method of claim 22, wherein attaching the ACT onto the cable comprises attaching the ACT onto the cable from a cable lay vessel, and wherein positioning the ACT and the cable along the seabed or shoreline comprises simultaneously deploying the ACT with the cable lay.

24. The method of claim 22, wherein attaching the ACT onto the cable comprises attaching the ACT onto the cable after the cable has been laid.

25. The method of claim 22, wherein the resilient flaps overlap each other over a portion of the trench.

26. The method of claim 22, wherein each resilient flap has anisotropic flexion such that the resilient flap is configured to more readily flex in a first direction than in a second direction.

* * * * *